Oct. 7, 1952
W. R. McDANIEL
MACHINE FOR REMOVING METALLIC
ELEMENTS FROM FLEXIBLE STRIPS
2,612,949
Filed Sept. 25, 1950
4 Sheets-Sheet 2
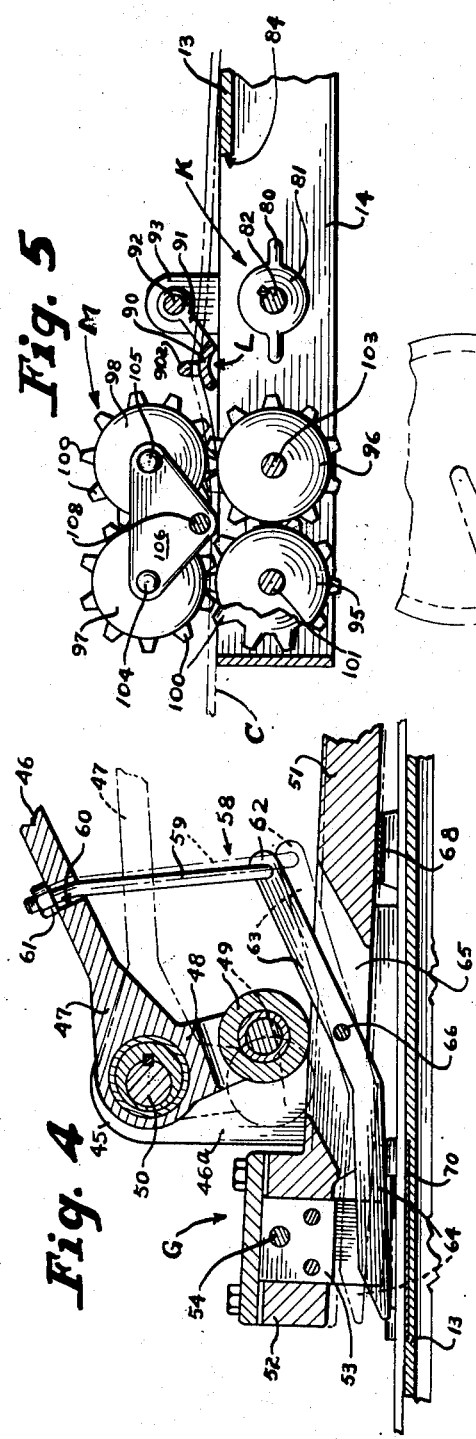
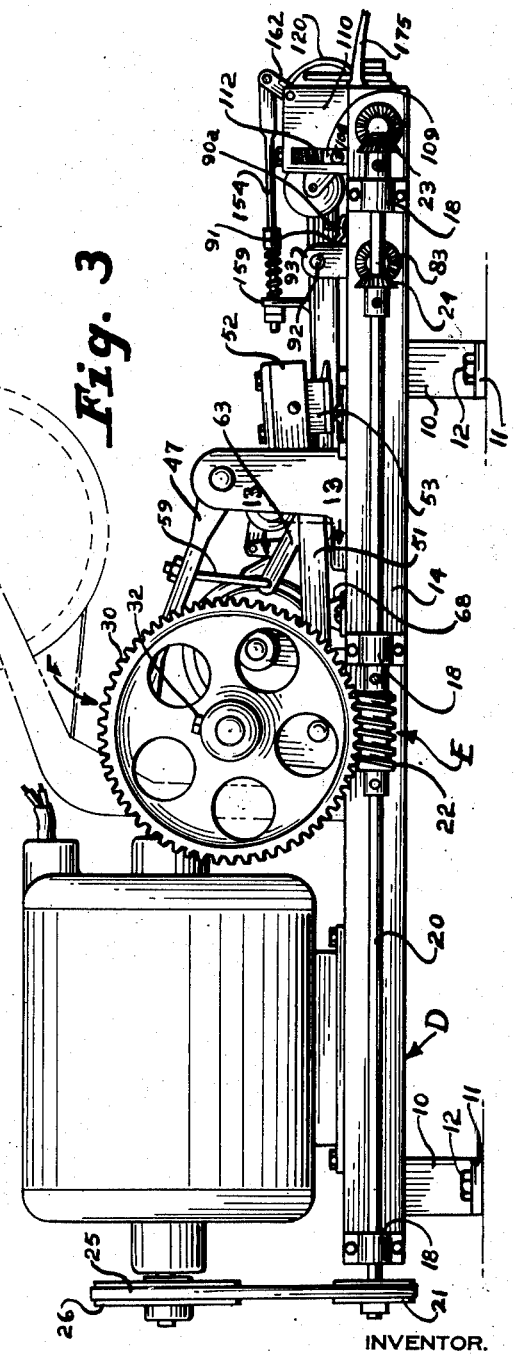
INVENTOR.
WILLIAM R. McDANIEL
BY
ATTORNEYS.

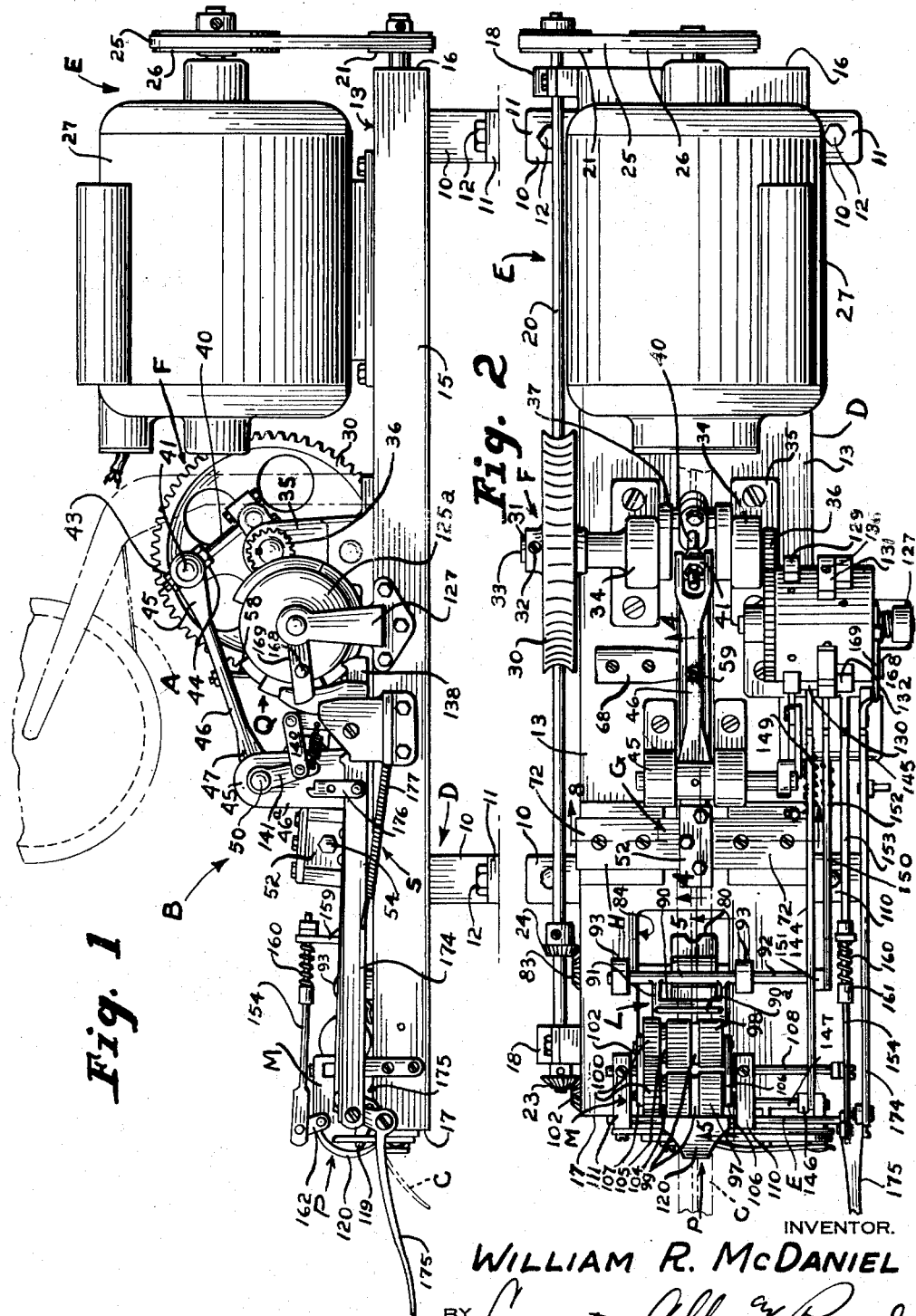

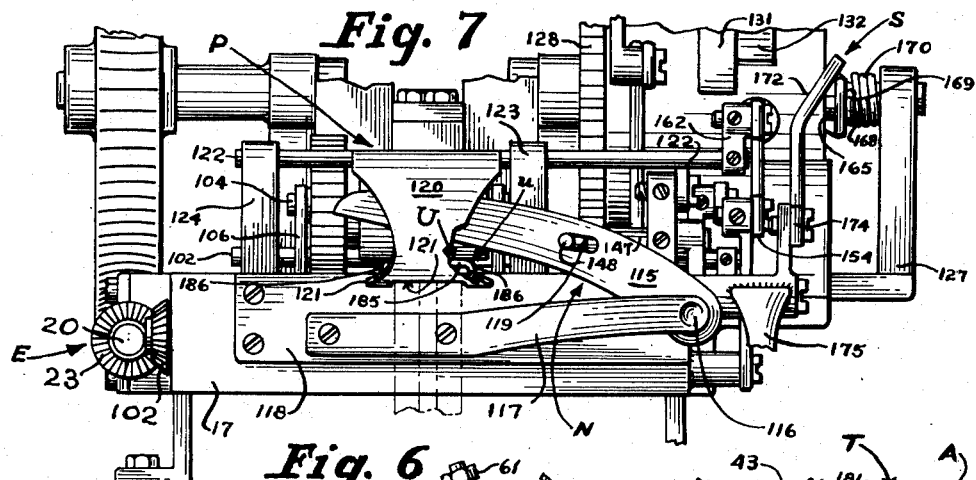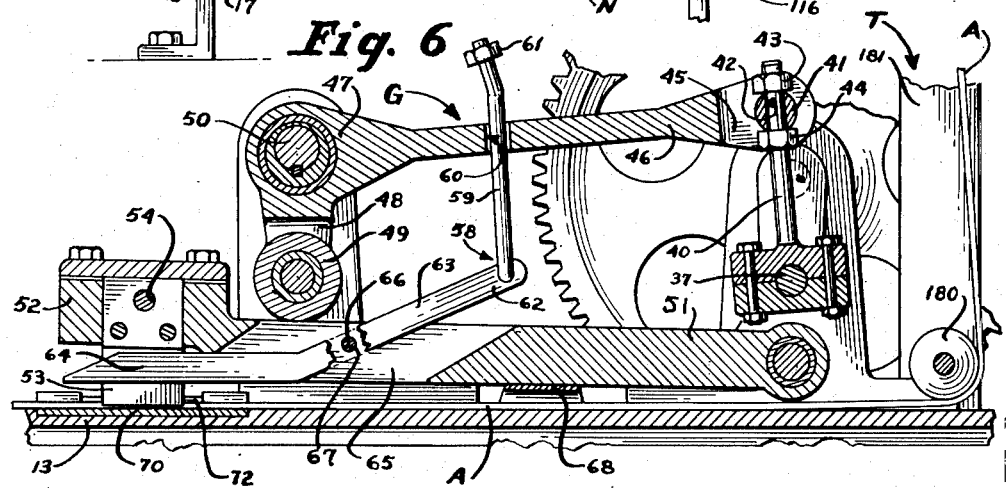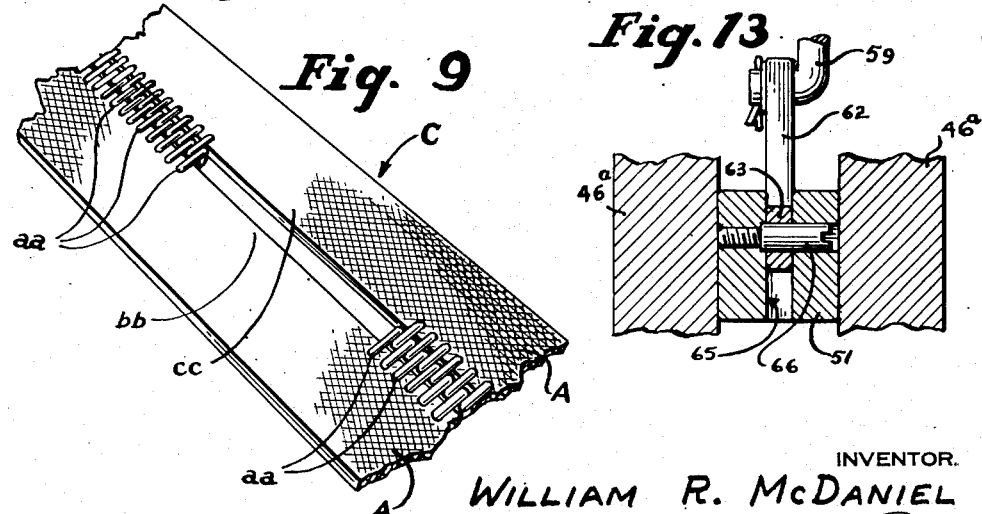

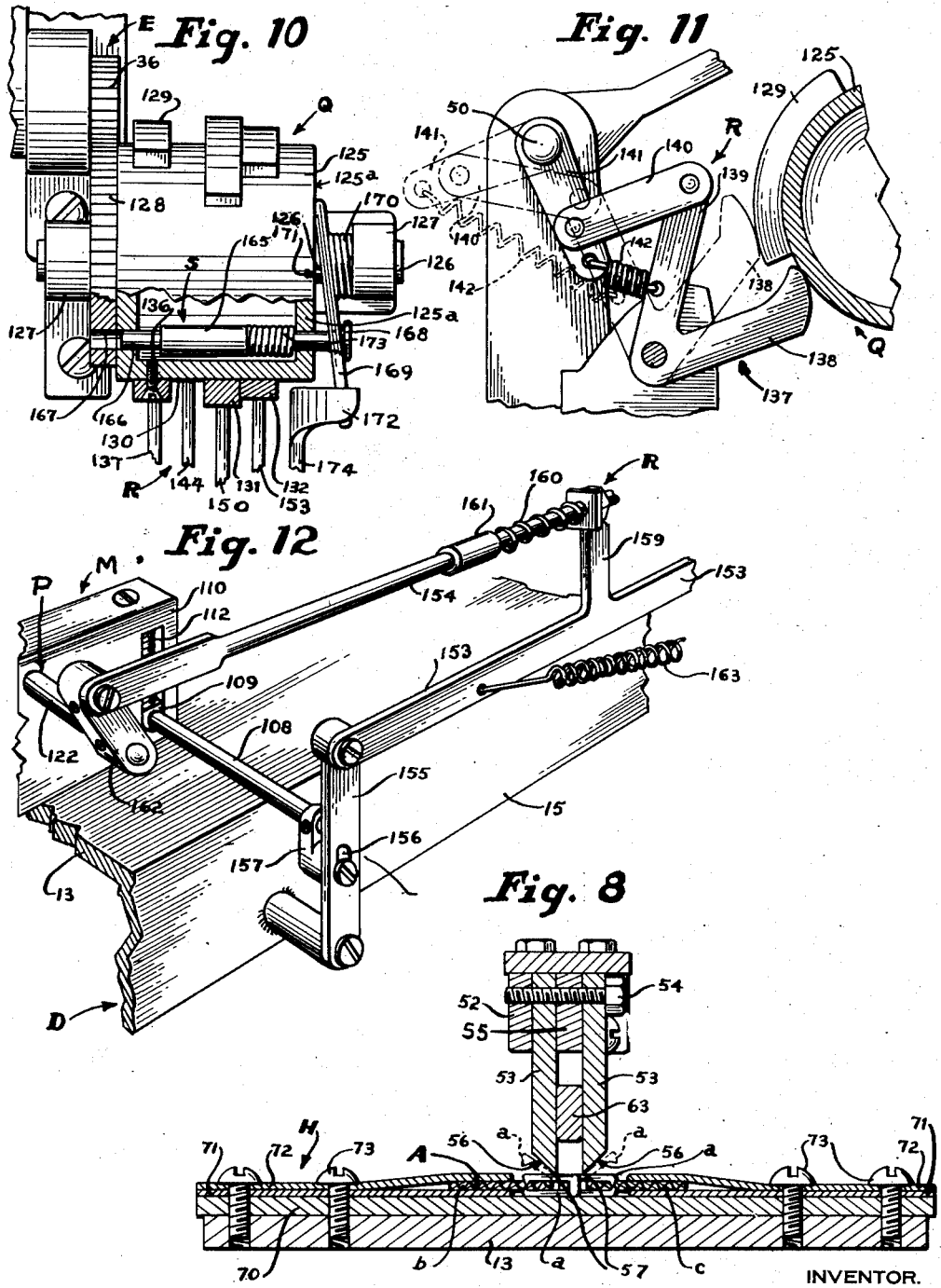

Patented Oct. 7, 1952

2,612,949

UNITED STATES PATENT OFFICE 2,612,949

MACHINE FOR REMOVING METALLIC ELEMENTS FROM FLEXIBLE STRIPS

William R. McDaniel, Englewood, Tenn.

Application September 25, 1950, Serial No. 186,579

14 Claims. (Cl. 164—42)

This invention relates to cutting machines and more specifically to machines for automatically cutting off and removing a portion of an associated group of metallic or similar elements carried by a fabric or like strip, then removing the remainder of the severed elements, but leaving others of the elements still carried by the strip, and then severing the strip at a location where the elements had been removed. An example of such a machine is one constructed and arranged to cut off and remove a plurality of the metal teeth or slide fastener elements of a length of so-called slide fastener tape, so as to leave a space, free of the teeth or elements longitudinally of the tape, and then sever the tape at this space.

An important object of the invention is to provide a machine to automatically cut off and remove a portion of a length of metallic or like material projecting outwardly of the plane or planes of the faces of a fabric or like strip, by which strip the length is carried, and then sever the strip at the space provided by cutting off and removing this portion of material. Such a machine will enable users who require various lengths or sections of slide fastener tape to prepare their specific length of tape sections from a roll or like arrangement of slide fastener tape, rather than stock a plurality of preprepared lengths of tape. At times, a number of these preprepared and stocked lengths are not used, because of changes in the design of clothing, for example, and these surplus lengths may become a stock loss. Such a loss will not occur if the required sections are prepared as needed.

Another important object of the invention is to provide a machine as described which may be readily adjusted so that the distances between successive sections of the lengths of the metallic or like elements cut and removed may be varied to suit specific conditions and, at the same time, the lengths of the cut off tape may be correspondingly varied.

While slide fastener tape has been proposed as provided in elongated strips and comprising a plurality of predetermined spaced-apart series of slide elements disposed on a fabric strip or tape, each series is of equal length and, thus, the user who desires to employ various lengths must stock a plurality of such elongated strips and may find, after a time, changes in garments, for example, employing such lengths, entails discarding these elongated strips and they, too, become a stock loss.

Reducing, by hand, the length of a specific-length strip in order to adapt it for use where a lesser length is required is a laborious operation but, with the use of the machine herein disclosed, the operator may quickly set the machine to prepare a required length of tape and have it prepared in a fraction of the time a hand-altered length of tape can be prepared.

The loss sustained in the cutting and removal of the fastener element from a roll, for example, of tape containing an unbroken length of fastener elements, is negligible, since such roll can be manufactured at a considerable saving over the cost of manufacture of a roll of like length containing spaced-apart series of slide fasteners.

A further important object of the invention is to provide a novel means for cutting or severing separable fastener elements or the like, attached to a tape or the like.

Another important object is to provide, in conjunction therewith, means to operate the elements cutting or severing means of the machine and dislodge any severed elements or the like lodged in the cutting and severing means.

In addition, another important object is to provide means to remove the cut or severed fastener elements or the like from the tape or the like.

A further important object is to prevent the last-named means from removing or damaging unsevered fastener elements or the like carried by the tape or its equivalent.

Furthermore, a major object is to provide means to draw through the new machines, the material to be acted upon, and which means also retains the material taut during final severing thereof at the space or area freed of the separable fastener elements or the like.

Another important object of the invention is to provide means, cooperating with the last-named means to grip the outer end of the material, so it will be held taut during final severing and then release the severed material sections in position to drop into a suitable container.

Other objects and advantages of the invention will be apparent during the course of the following detailed description of the invention, taken in connection with the accompanying drawings, forming a part of this disclosure, and in which drawings:

Fig. 1 is an elevation of what will be termed, hereinafter, the controls side of the new machine.

Fig. 2 is a top plan of the new machine.

Fig. 3 is an elevation of what will be termed, hereinafter, the shaft side of the same.

Fig. 4 is a vertical section, on an enlarged scale, substantially on the line 4—4 of Fig. 2.

Fig. 5 is a vertical section, also on an enlarged scale, substantially on the line 5—5 of Fig. 2.

Fig. 6 is a vertical section along the lines of that of Figure 4 but extending farther to the right of Figure 4, showing parts of fastener elements severing and dislodging means, in positions different than that of Fig. 4.

Fig. 7 is a view of the front or discharge end elevation of the new machine, with parts broken away to better illustrate portions of the construction.

Fig. 8 is a greatly enlarged view of the cutting devices of Fig. 6 associated with material in place to be acted upon thereby.

Fig. 9 is a perspective view of the material, after being acted upon by the means of Fig. 8 and a portion of the means of Fig. 5.

Fig. 10 is a view of the peripheral face of a pattern drum, partly broken away in order to show structure within the drum body.

Fig. 11 is a fragmentary elevation of a cutting means control associated with the pattern drum.

Fig. 12 is a fragmentary perspective of certain control means for the means to render the material taut preparatory to severing.

Fig. 13 is a vertical section, on an enlarged scale, substantially on the line 13—13 of Fig. 3.

In the drawings, wherein for the purpose of illustration is shown a preferred embodiment of the invention and wherein similar reference characters designate corresponding parts throughout the several views, the latter A designates material to be modified or prepared by the new machine, which latter is designated generally as B, while the letter C designates the material as modified by the new machine B.

For the purpose of illustration the material A may be a conventional separable fastener assembly comprising two flexible parallel strips of fabric, bb and cc, each disposed in substantially the same plane and each detachably interconnected at their facing edges by conventional metallic separable fastener elements aa, arranged in continuous lengths longitudinally of the strips. Such fastener elements are generally conventionally crimped, at their inner end portions to hems or enlarged edge portions of the strips, and thus extend outwardly of the planes of the side faces of the strips to which they are secured. Thus, the separable fastener assembly differs materially from a substantially flat strip or ribbon of material, which has no protuberances, such as the fastener elements. It is proposed that the assembly be provided in considerable length and may be rolled up into a roll convenient for handling.

The new machine B, comprises a support portion D; drive means E; operative connection F between the drive means E and a pattern drum Q of the machine; separable fastener elements severing and fragment removing means G; guide means H to guide the material A to a position to be acted upon or modified by the means G; beater means K to clear the modified material C of any remaining severed separable fastener elements; path-changing means L for the modified material; modified material moving and gripping means M; modified material shearing or severing means N; auxiliary modified material gripping means P; pattern drum Q; combined control means R for the means G, L, M, N and P; means S to control the operation of the pattern drum; auxiliary guide means T for the strip material A and auxiliary guide means U for the strip material C.

The strip material A is shown as comprising removable elements aa, such as separable fastener elements, carried at the inner edge portions of flexible normally parallel strips bb and cc, with one end portion of the elements aa projecting outwardly of these edge portions and with side portions of the elements aa projecting outwardly of the planes of the side faces of the strips bb and cc. Each element aa is shown as having two leg portions with pointed feet pressed into the fabric strips bb or cc as the case may be. This is a conventional way so-called separable or slide fastener elements are attached to the fabric strips of slide fastener tapes or strips.

Referring mainly to Figs. 1, 2 and 3, the support portion D of the new machine B, includes a suitable number (as four) legs 10 which, because of the plurality of motions necessary to provide the material C and sever it into suitable lengths, are preferably provided with feet 11, carrying means 12, as conventional bolt and nut assemblies, to secure the support portion D to a suitable base (not shown but which may be a conventional work bench), so that the machine, as a whole, will not rock.

The legs 10 extend downwardly from a base plate 13 which is preferably provided with a downwardly-extending side flange 14, which may be termed the shaft-side flange, a similar, parallel side flange 15, which may be called the controls side flange, a downwardly extending end flange 16 which may be designated as the rear end flange, and a like flange 17, parallel therewith, which may be termed the forward end flange.

Extending, as from the flange 14 are horizontal bearings 18 for the shaft 20 to be next described.

Drive means E preferably includes a horizontally-disposed shaft 20, rotatably carried by the bearings 18, provided with a driven pulley 21 at its rear end portion, a worm 22 intermediate its end portions, and shown in Fig. 3, a first bevel gear 23 at its forward end portion, and a second bevel gear 24 spaced from and between the worm 22 and gear 23, all being fixed to the shaft 20 to rotate therewith but may be provided with conventional means to permit their removal from the shaft 20, such as set screws, extending through the hubs of the pulley, worms and bevel gear, and bearing against the shaft. The hubs may be conventionally disposed with reference to the bearings 18 so as to prevent longitudinal shifting of the shaft 20.

From the pulley 21 extends a suitable endless belt 25 to the drive pulley 26 of, for example, a conventional electric motor 27 which latter may be mounted upon the base plate 13 adjacent the flange 16.

There is provided a single operative connection means F between the drive means E and the separable fastener elements removing means G and the pattern drum Q, and the means F includes a worm wheel 30, detachably secured to a crank shaft 31 extending above and transversely of the base plate 13. This connection may be a set screw 32 extending through the hub of the wheel 30 and bearing on one straight end portion 33 of the crank shaft.

The crank shaft 31 is rotatably carried by spaced-apart bearings 34 mounted upon standards 35 carried by the base plate 13, and the opposite straight end portion of the crank shaft 31 carries a spur gear 36 of a less diameter than that of the worm wheel 30. For example, the ratio may be 1:5.

The crank pin portion 37 of the crank shaft 31 is operatively associated with the means G, next to be described, and the gear 36 is operatively associated with the pattern drum Q.

Initial operations upon the material A are performed by the separable fastener elements removing means G, which includes a connecting rod 40 with its lower end portion embracing the crank pin portion 37 and extending from thence upwardly, at an angle between the vertical and horizontal, and, at its upper end portion, it is adjustably connected to the intermediate portion of a pivot pin 41, as by being provided with screw threads at said upper end portion, with this portion extending through a suitable opening 42 in the pivot pin 41 and carrying nuts 43 and 44 disposed to either side of the pin 41, as in Fig. 6.

The pivot pin 41 extends through the bifurcated upper end portion 45 of a rocker arm 46, while the opposite or lower end portion 47 of this arm (as shown in Fig. 4) has an offset portion 48 (which may form substantially a right angle with the rest of the rocker arm) rotatably carrying a roller 49 with its axis, of course, transversely of the longitudinal axis of the bed plate.

This lower end portion 47 is eccentrically mounted upon a shaft 50 which is rotatably carried by the bearings 45 of spaced-apart standards 46a.

Pivotally supported at its rear end, as by the standards 35, and slightly above the bed plate, is a cutters-carrying or knives-carrying arm 51 which extends forwardly and is best shown in Figs. 3, 4 and 6. Its forward end portion is provided with a recessed head 52 and this detachably carries a pair of suitable spaced apart, vertically-disposed cutters or knives 53, with their upper end portions within the recess of the head and their lower sharpened end portions projecting below the head 52. The knives may be retained upon the head as by a suitable screw 54 and spaced by a shim or the like. The lower end portion of each knife, adjacent the sharpened edge 57 has its outer side face bevelled, as at 56 and the sharpened edges 57 of the knives extend longitudinally of the bed plate and are spaced apart a distance sufficient to cut through the uppermost legs of the interconnected separable fastener elements aa of the material A intermediate their heads and arms, as may be appreciated from Fig. 8. Sufficient of the interconnected portions of the elements aa are severed by the knives to make it easy for the remaining portions of the severed elements aa to be subsequently shaken or beaten loose from the fabric strips bb and cc, by the beater means K, particularly since the bevelled faces 56 tend to cant the outer portions of the uppermost elements and thus pull them from the fabric strips bb and cc.

I have provided a triple-function means 58 for (1) operatively connecting the arm 51 and the rocker arm 46 and (2) for removing fragments of fastener elements which may become lodged or wedged between the knives 53 and (3) for functioning as a beater to break away any nearly severed separable fasteners. This means 58 includes a downwardly-extending member 59, as a rod, slidable through a downwardly-extending opening 60 in the rocker arm 46, intermediate its ends, and which member 59 is provided with means 61 to limit downward sliding movement thereof with respect to the rocker arm. Such means is shown as screw threads upon the upper end portion of the member and a nut cooperating therewith and bearing against the upper face of the rocker arm. This, too, provides means for adjustment of the extent the member 59 may depend from the rocker arm.

The lower end portion of the member 59 is pivotally connected with the rearward end portion 62 of an oscillating arm 63, with this end portion and the forward end portion 64 forming an obtuse angle. This forward end portion as well as the intermediate portion of the arm 63 extends through an elongated, longitudinally extending slot 65 in the knives-carrying arm 51, which slot opens, at its forward end, below the head 52, as in Fig. 6. Intermediate its ends, the oscillating arm 63 carries a pivot pin 66 which pivotally projects into suitable axial aligning openings in the arm 51 (one being shown in Fig. 4).

The forward end portion 64 of the arm 63 extends into the space between the knives 53, normally above their lower edges.

The roller 49 rolls over that portion of the upper face of the knives-carrying arm 51 rearwardly of the head 52 as the rocker arm 46 changes its position with respect to the knives-carrying arm 51, as may be seen by comparing Figures 4 and 6.

Means 68 to urge the knives-carrying arm 51 upwardly may be a leaf spring carried by the bed plate 13 and projecting from its upper face and bearing against the under face of the arm 51.

There is, of course, an up-and-down oscillation of the knives-carrying arm 51 and an up-and-down oscillation of the arm 63. The first causes the knives 53 to descend and then rise but does not affect the arm 63 until the knives begin to rise whereupon the forward portion 64 of the arm 63 will descend in the space between the knives, clearing their lower edges, and then ascend again to the position substantially as shown in Fig. 6. Of course, the descent of the knives severs the separable fastener elements and the descent of the forward portion 64 clears the space between the knives of any fragments of these severed elements which might jam this space. The forward end portion 64 also taps the material A at the area of severed elements and tends to break off any partly cut away element material.

Guide means H is provided to guide the material A into the correct position under the knives 53. The means comprises two sets of plates, each set preferably consisting of plates 70, 71 and 72, as shown in Fig. 8. The plate 70 is longer than the others, is disposed upon the bed plate 13 and projects across the bed plate and, above this plate 70, are two plates 71 with their inner edges spaced apart a distance very slightly greater than the length of two inter-connected separable fastener elements. The thickness of either of the plates 71 is substantially equal to the distance the separable fastener elements project from the faces of their associated tapes. Above each plate 71 is a plate 72 of springy metal, having a bowed rear edge portion, and the tapes of the material A are adapted to slide between the inner faces of these plates 71 and 72, but the separable fastener elements clear the inner end edges of both plates 71 and 72. In order to removably secure the plates 70—72 to the bed plate 13 and in associated relation, I prefer to provide a pair of screws 73 for each set. These extend through suitable openings in the plates 70—72 and into screw threaded sockets in the bed plate with their heads bearing upon the upper face of the plates 72 which, being bowed as stated, permits a desired frictional grip to be exerted by the plates 71 and 72 upon the tapes of the material A, depending upon the tightening or loosening of the screws. Obviously, the material is properly positioned by loosening the screws 73 and removing the plates 72, then placing the material A in position, and replacing the plates 72 and screws 73.

The beater means K to clear the material A of any remaining severed separable fastener elements (these being mostly severed elements upon the under side of the tapes) comprises a suitable number, as two, of beater elements 80 such as blades or vanes, carried by and projecting radially from a rotating member 81, as a drum, fixed to a shaft 82 which may be journalled in the flanges 14 and 15 so as to project outwardly of the first and fixedly carry bevel gear 83 meshing with the bevel gear 24 of the drive means E.

In order that the beater means K may function properly, the base plate 13 is provided with a slot 84 extending longitudinally thereof so that the material A may move directly over the slot 84 and portions of it be in the path of travel of the beater elements 80. As these elements 80 strike the under side of the material A they will dislodge the severed separable fastener elements and they will drop through the slot.

Associated with the beater means K is the path-changing means L for changing the straight longitudinal path of the forwardly-moving material A so that the beater elements 80 will strike the material only at that area thereof where the separable fastener elements have been cut and, thus, there will be no damage to the unsevered separable fastener elements. This means L is a preferably upwardly convex plate 90 disposed quite close to the means K and carried by a pair of oscillating arms 91, one being shown in Fig. 5, which may extend downwardly and forwardly and have a shaft 92 carried by bearings 93 (best shown in Fig. 2) supported by a standard fixed to the bed plate 13. One end portion of the shaft 92 extends outwardly of one of the bearings toward the controls side of the new machine B. When in operation, the shaft 92 rotates a part of a complete rotation clockwise (as viewed from this controls side) and the plate 90 rises, carrying the material A with it, out of the path of the beater elements 80 for the period in which the material A containing the unsevered fastener elements is passing over the beater elements, then the shaft 92 rotates a partial complete revolution anti-clockwise and the plate 90 descends so that the beater elements 80 may function as the material A descends with the plate 90. I may provide a small arcuate retaining member 90ª spaced above and paralleling the plate 90 and carried by spaced-apart arms extending from the plate 90. The material C is threaded between the plate 90 and member 90ª.

Beyond the means L is the material moving and positioning means M which is adapted to advance the material A to be acted upon by the means G, K and L (after acted upon by the means G and K, the material A becomes the material C of Figure 9), and position it to be properly severed. The means M preferably comprises the rollers 95, 96, 97 and 98 of Fig. 5, which are substantially alike. Each has an annular groove 99 intermediate its ends, to receive that part of the material C containing the separable fastening elements aa, while the periphery, to either side of the groove 99 is adapted to frictionally grip the tapes of the material, and each roller has a spur gear 100 connected therewith at one end of the roller, with the teeth adapted to mesh as will be described.

The lower roller 95 with its gear 100 is fixedly mounted upon a shaft 101 which projects therefrom and fixedly mounts a bevel gear wheel 102 in mesh with the gear 23 mounted upon the shaft 20. The shaft 101 may be journalled in the side flanges 14 and 15.

The lower roller 96 has its shaft 103 also journalled in the flanges 14 and 15 and rotates with the roller 95 but, of course, in the opposite direction.

The upper rollers 97 and 98 each have separate shafts 104 and 105 respectively, but these are carried by bearings 106 and 107 which are adapted to rock and these bearings are secured, in spaced-apart relationship, to a support rod 108 extending through vertically-reciprocable bearing blocks 109 slidably carried by suitable standards 110 and 111 mounted upon the bed plate 13 and the blocks 109 are urged downwardly by suitable means, as expansion spiral springs 112. This construction is provided so that, as the bearings 106 and 107 rock longitudinally of the bed plate in one direction, the teeth of the gear 100 associated with the roller 97 will operatively mesh with those of gear 100 associated with roller 95 or, when the bearings 106 and 107 rock in the other direction the teeth of the gear associated with roller 98 will operatively mesh with the teeth of the gear associated with roller 96. Not only will these changes take place but, in the first case, the rollers 95 and 97 will grip the material C and move it forwardly, then there will be a momentary slackening of this gripping as the bearings 106 and 107 have their upper faces horizontal, after which the rollers 96 and 98 will grip the material C and cause it to move rearwardly, whereupon there will be the slight momentary slackening of the gripping until the rollers 95 and 97 again grip the material and move it forwardly. As will be explained subsequently, the grip of the rollers 95 and 97 is of much longer duration than that of the rollers 96 and 98.

The springs 112 provide a resilient means for urging the several gears 100 in mesh, yet cushion the meshing.

Forwardly of the means M is the shearing or cutting means N which preferably includes a suitable knife 115 best shown in Fig. 7 and oscillatively mounted at one of its end portions upon a pivot 116 carried by a bracket 117 preferably supported by a plate 118 fixed to the outer face of the end flange 17.

The knife 115 is provided with a longitudinally-extending slot 119 intermediate its end, but nearer the pivoted end and the slot accommodates a movable pin forming part of the knife operating means to be subsequently described. Of course, the path of the oscillating knife 115 is across the material C where it extends forwardly from between the rollers 95 and 97.

Material gripping means P is provided for gripping the material C when the means N is functioning to cut the material. This means comprises a preferably outwardly convex jaw 120 having a lowermost straight lower edge 121 which is adapted to grip the material C and press it tightly against the plate 118. The upper end portion of the jaw 120 is carried by a horizontally-disposed rock shaft 122 journalled in spaced-apart bearings 123 and 124 carried as by the standards 110 and 111.

Just as the rollers 96 and 98 begin to engage the material C and rotate with the roller 96 clockwise and the roller 98 anti-clockwise (as viewed from the controls side of the machine), the edge 121 of the jaw 120 grips the material C and the material is thus rendered taut so that the knife 115 can make a clean cut. The jaw 120 then pivots upwardly, releasing the severed section of material C and the bearings 106 and 107 rock forwardly so that the rollers 95 and 97 (the first rotating anti-clockwise while the roller 97 rotates clockwise) grip the material C and project it forwardly.

The pattern drum Q may be of conventional construction, and includes a drum body 125 mounted for rotation upon a shaft 126 carried by a bracket 127 which may be fixed to the flange 15. To the drum body 125 is detachably secured a gear wheel 128 with its teeth meshing with those of the gear 36 and this wheel 128 is fixed for rotation on the shaft 126. The peripheral portion of the drum body carries a plurality of removable lugs, such as the lugs 129 to 132 inclusive, which function, with the drum's periphery, as cams, and which may be moved to various positions upon this periphery where they may be fixed, as by screw means 136. They engage various arms, to be described, which arms are associated with the means G, L, M, N and P and actuate these means.

The first lug 129 provides a cam surface to cause oscillation of the first of the combined control means R which first includes a substantially L-shaped arm 137, shown in Fig. 11, pivoted adjacent the juncture of its two portions 138 and 139, with the portion 138 extending rearwardly so that its end part is disposed in the path of travel of the lug 129 and the portion 139 extending upwardly where it is pivoted to the rear end portion of a link 140, with the forward end portion pivoted to an arm 141 fixed to the shaft 50 which shaft eccentrically mounts the lower end portion of the rocker arm 47 of the means G, as stated. A retraction spiral spring 142 connects the intermediate part of the arm portion 139 and the free end portion of the arm 141. As the drum body 125 rotates, the lug 129 will engage the portion 138 of the L-shaped arm 137 and oscillate the arm in one direction causing partial rotation (about 50 degrees for example) of the shaft 50 and descent of the knives carrying arm 51 so that the knives 53 will cut through the separable fastener elements as described, whereupon the arm portion 138 will ride off the lug and the arm 137, link 140, spring 142 and arm 141 will rotate the shaft 50 back (as 50 degrees for example) to its original rotative position.

Another, as lug 130, actuates a first elongated arm 144, with its rearward end portion carried in a slot of a slideway 145 so that the extremity of this portion is in the pathway of the lug 130. The forward end portion of the arm 144 is pivotally connected with the upper end portion of an upwardly-extending arm 146 fixed to a hub 147 rotatably supported from the base plate 13, and carrying a radially-extending pin 148 extending into the slot 119 in the knife 115 of the means N. Reciprocation of the elongated arm 144 causes rocking of the arm 146, partial rotation of the hub 147 and, consequently, oscillation of the knife 115 to sever the material C. A retraction spiral spring 149 fixed at one end to the intermediate portion of the arm 144 and at its other end to the base plate 13 normally urges the arm 144 toward the rear.

A third lug 131, also mounted upon the drum's periphery, actuates a second elongated arm 150, with the rearward end portion of the latter slidable within a second slot in the slideway 145 so that the extremity of this portion will be in the path of travel of the lug 131. The arm 150 has its forward end portion pivotally connected with a short arm 151 mounted upon the shaft 92 of the path changing means L. Reciprocation of the arm 150 will oscillate the arm 151 and cause partial rotation of the shaft 92 thus raising and lowering the convex plate 90 of means L. A suitable retraction coil spring 152 attached to the arm 150 and base plate 13 tends to draw the arm 150 rearwardly.

A fourth lug 132, mounted as are the other lugs, actuates a third elongated arm 153 as well as a shorter arm 154, carried by the arm 153, shown particularly in Fig. 12. These are associated with the means M and P. The rear end portion of the arm 153 slides in a third slot in the slideway 145 and its extremity is positioned in the path of travel of the fourth lug 132, while the forward end portion of the arm 153 is pivotally connected with the upper end portion of an upstanding arm 155 pivotally carried at its lower end portion by the flange 15. Intermediate its end the upstanding arm 155 is provided with a short slot 156 carrying a pivot pin for a crank 157 fixed to the free end of the rod 108 of the means M.

The shorter arm 154 is slidably mounted at its rearward end portion upon a bracket 159 upstanding from the third elongated arm 153 and a suitable expansion spiral spring 160 bearing at one end, against an abutment 161 intermediate the ends of the arm 154 and bearing against the bracket at the other end, urges this arm 154 forwardly. The other end portion of the latter is pivoted to a crank 162, carried by the rock shaft 122 of the means P. The arm 153 carries a retraction spiral spring 163, secured thereto at one end and secured to the bed plate at its other end.

As the third elongated arm 153 reciprocates it causes rocking of the bearings 106 and 107 and consequent movement of the material C either forwardly or rearwardly and, because the rearward movement is but momentary, the lug 132 is shaped accordingly to provide, with the drum body periphery, the necessary cam surface to cause the movements, as is well known in the art. At the same time, these reciprocatory motions cause actuation of the means P, as is obvious (since any differences in the extent of the movements is compensated for by the spring 160, as is also well known in the art.)

Means S to control the operation of the pattern drum Q and, consequently, through the means R, to control operation of the means G, L, M, N and P, includes a sliding bolt 165 extending substantially parallel with the axis of rotation of the drum body and carried by this body and projecting from the ends thereof as may be appreciated from Fig. 10. One end portion 166 of the bolt is adapted to slide into and out of a socket 167 in the gear wheel 128 and when the portion 166 is within the socket 167 the drum body 125 will rotate with the gear wheel 128 but when it is free of the socket, the drum body will not rotate even while the gear wheel 128 is rotating. (The teeth of wheel 128 are in mesh with the teeth of gear wheel 36.) The other end portion of the bolt 165 is provided with a flanged head 168 extending outwardly of the outer end wall 125a of the body 125, with a collar 169 extending about the bolt 165 inwardly of the head. The collar 169 has an extension provided with an opening accommodating the shaft 126. This collar is urged toward the drum end wall 125a by an expansion spiral spring 170 about the shaft 126 with one end bearing against the collar 169 and the other end bearing against the bracket 127.

Adapted to engage the face 171 of the collar 169 between the collar and adjacent face of the end wall 125a of the drum body is a canted arm 172 which extends upwardly and toward the controls side of the machine. When this arm is extended (as will be described) toward the shaft 126 it will engage this face 171 and, as the drum continues to rotate will cause the bolt 165 to be withdrawn from the socket 167 and, consequently, the drum Q to cease rotating. Because the bolt 165 is urged to extend with its portion 166 into the socket 167 by an expansion spiral spring 173, bearing at one end upon the inner face of the end wall 125a and bearing at its other end upon a shoulder of the bolt, the bolt end portion 166 will enter the socket when the arm 172 does not engage the collar 169.

The canted arm 172 extends upwardly from an elongated arm 174 which may slide in a slot in the slideway 145 and extends, at its other end, to a crank or lever assembly 175 adapted to reciprocate the arm 174.

Pivotally mounted upon the arm 174 near the slideway 145 is a keeper 176 which, when paralleling the arm 174, and extending toward the slideway, engages, at its free end, a wall thereof so that the arm is held retracted (i. e., so that the canted arm 172 does not engage the collar 169) but, when the keeper 176 is pivoted to disengage its free end from the slideway, the arm 174 is extended and the arm 172 is in position to engage the collar. Means to urge the arm 174 toward the rear (i. e., so that the arm 172 is in the last position mentioned) may be a retraction spiral spring 177 with one end fixed to the arm 174 and its other end secured to a fixed part of the machine, as the flange 15.

Of course, with the keeper 176 in its raised position, actuation of the canted arm 172 to actuate the bolt 165 may be manually effected by manipulating the assembly 175 to slide the arm 174 rearwardly so that the canted arm may engage the collar 169. This enables an operator to manually throw the means G, L, M, N and P into operation for a selected period or, if the machine B is to operate for an extended period, the keeper 176 is raised and the arm 174 extended.

Auxiliary guide means T for the material A may be provided as shown in Fig. 6 comprising a roller 180 carried slightly above the bed plate 13 between the motor 27 and means G as by an upstanding bracket 181 secured to the bed plate 13. The material A may be extended about the roller 180 as shown in Fig. 6 and come from a suitable supply, as a roll, carried, as for example, by the upper portion of the bracket 181 as shown in dots and dashes in Fig. 3.

In addition, it is preferred to provide auxiliary guide means U for the material C after it leaves the material gripping and moving means M and before it is severed by the shearing means N and this is shown in Fig. 7. This is somewhat like the retaining member 90a, although the horizontal portion 185 is shown as substantially straight with its upstanding arms 186 secured to the bed plate, at its extreme forward end, and the material C may be threaded between the portion 185 and bed plate and side play is prevented by the arms 186.

In order to change the timing of the movements of the means G, L, M, N and P, the removable lugs 129 to 132 inclusive must be changed as to position upon the periphery of the drum and/or length. Such changes are well known in the art of pattern drums and pattern wheels.

Various changes in the form of the invention herein shown and described may be made without departing from the spirit of the invention or scope of the claims.

What is claimed is:

1. In a machine for processing strip material, said strip material including a flexible strip provided with substantially rigid elements separate from and attached to the strip and extending from a face thereof in a continuous, longitudinally-extending row, said machine including means to move said strip material along its longitudinal axis; a movable knife; means to intermittently move said knife to cut through selected portions of said elements to remove portions of the elements, while leaving strip-attached portions of the cut-through elements attached to said strip; and means to remove the strip-attached portions of the cut-through elements from said strip.

2. In a machine for processing strip material, said strip material including a flexible strip provided with substantially rigid metallic elements separate from and attached to the strip and extending from a face thereof in a continuous, longitudinally-extending row, said machine including means to move said strip material along its longitudinal axis; a movable knife having a cutting edge and a bevelled face adjacent said edge; means to intermittently move said knife to cut through and loosen selected portions of said elements while leaving strip-attached portions of the cut-through elements attached to said strip; mechanical means to remove the loosened selected portions of said elements; and means to remove the strip-attached portions of the cut-through elements from said flexible strip.

3. In a machine for processing strip material, said strip material including two flexible strips each provided with substantially rigid metallic elements separate from and attached to their strip and extending from a face thereof in a continuous, longitudinally-extending row, said machine including means to move said strip material along its longitudinal axis; a pair of mutually moving, spaced-apart and parallel knives; dual-function means to intermittently move said knives in the same direction and at the same time to cut through selected portions of said elements while leaving strip attached portions of the cut-through elements attached to said strips, and to dislodge cut-through portions of said elements from between said knives; and means to remove the strip attached portions of the cut-through elements carried by said flexible strip.

4. In a machine for processing strip material, said strip material including two flexible strips each provided with removable elements separate from and attached to their strip and extending from a face thereof in a continuous, longitudinally-extending row, said machine including means to move said strip material along its longitudinal axis; a pair of mutually moving, spaced-apart and parallel knives; dual-function means to intermittently move said knives in the same direction and at the same time to cut through selected portions of said elements, and to dislodge cut-through portions of said elements from between said knives including an oscillating knives-carrying arm, supporting said knives, a pivot for one end portion of said arm, a rocker arm above said knives-carrying arm and provided with an offset portion and a roller carried by said offset portion and bearing upon said knives-carrying arm, a downwardly-extending member, slidably carried by said rocker arm, an oscillating arm pivoted at one end portion to the lower portion of said member and pivoted intermediate its ends to said knives-carrying arm and with its free end extending between said knives, crankshaft means operatively connected with one end portion of said rocker arm to cause rocking of said rocker arm, and an eccentric shaft operatively connected with the other end portion of said rocker arm above said offset portion; and means to cause partial back-and-forth rotation of said eccentric shaft, and means to remove the cut through elements carried by said flexible strip.

5. In a machine for processing strip material, said strip material including two flexible strips each provided with removable elements separate from and attached to their strip and extending from a face thereof in a continuous, longitudinally-extending row, said machine including means to move said strip material along its longitudinal axis; a pair of mutually moving, spaced-apart and paralleling knives; dual-function means to intermittently move said knives in the same direction and at the same time to cut through selected portions of said elements, and to dislodge cut-through portions of said elements from between said knives including an oscillating knives-carrying arm, supporting said knives, a pivot for one end portion of said arm, a rocker arm above said knives-carrying arm and provided with an offset portion and a roller carried by said offset portion with its axis of rotation normal to the longitudinal axis of said rocker arm, said roller bearing upon the upper portion of said knives-carrying arm, a downwardly-extending member, slidably carried by said rocker arm, an oscillating arm pivoted at one end portion to the lower portion of said member and pivoted intermediate its ends to said knives-carrying arm and with its free end extending between said knives, crankshaft means operatively connected with one end portion of said rocker arm to cause rocking of said rocker arm, and an eccentric shaft operatively connected with the other end portion of said rocker arm above said offset portion; and means to cause partial back-and-forth rotation of said eccentric shaft, and means to remove the cut through elements carried by said flexible strip.

6. In a machine for processing strip material, said strip material including two flexible strips each provided with removable elements separate from and attached to their strip and extending from a face thereof in a continuous, longitudinally-extending row, said machine including means to move said strip material along its longitudinal axis; a pair of mutually moving, spaced-apart and paralleling knives; dual-function means to intermittently move said knives in the same direction and at the same time to cut through selected portions of said elements, and to dislodge cut-through portions of said elements from between said knives including an oscillating knives-carrying arm, supporting said knives, a pivot for one end portion of said arm, a rocker arm above said knives-carrying arm and provided with an offset portion and a roller carried by said offset portion and bearing upon said knives-carrying arm, a downwardly-extending member, slidably carried by said rocker arm, an oscillating arm pivoted at one end portion to the lower portion of said member and pivoted intermediate its ends to said knives-carrying arm and with its free end extending between said knives, crankshaft means operatively connected with one end portion of said rocker arm to cause rocking of said rocker arm, and an eccentric shaft operatively connected with the other end portion of said rocker arm above said offset portion; and means to cause partial back-and-forth rotation of said eccentric shaft; means normally urging upwardly the free end portion of said knives-carrying arm; and means to remove the cut through elements carried by said flexible strip.

7. In a machine for processing strip material, said strip material including a flexible strip provided with removable metallic elements separate from and attached at one end of each to the strip and extending from a face thereof and over an edge thereof in a continuous, longitudinally-extending row, said machine including means to move said strip material along its longitudinal axis; a movable knife; means to intermittently move said knife to cut through these portions of said elements extending outwardly of said edge, leaving the remaining portions of said elements attached to said strip; guide means to guide said strip material within the path of said knife; and means to remove the portions of the cut-through elements secured to said flexible strip.

8. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; and means to remove the cut-through elements from said flexible strip, including a beater for beating said strip material, said beater being disposed below the path of said strip material to beat said strip material after the strip material has been acted upon, as aforesaid, by said knife.

9. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; and means to remove the cut-through elements from said flexible strip, including a beater having a drum portion and blades extending therefrom, for beating said strip material, said beater being disposed below the path of said strip material to beat said strip material after the strip material has been acted upon, as aforesaid, by said knife.

10. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; and means to remove the cut-through elements from said flexible strip, including a beater for beating said strip material, said beater being disposed below the path of said strip material to beat the under surface of said strip material after the strip material has been acted upon, as aforesaid, by said knife.

11. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; means to remove the cut-through elements from said flexible strip, including a beater for beating said strip material, said beater being disposed below the path of said strip material to beat said strip material after the strip material has been acted upon, as aforesaid, by said knife; and path-changing means to retain out of the range of said beater, those portions of said strip material still containing said removable elements.

12. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; means to remove the cut-through elements from said flexible strip, including a beater for beating said strip material, said beater being disposed below the path of said strip material to beat said strip material after the strip material has been acted upon, as aforesaid, by said knife, including an upwardly-convex plate having an upper face to receive said strip material and means to move said upwardly-convex plate upwardly when said portions of said strip material still containing unsevered removable elements pass over said beater.

13. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; means to remove the cut-through elements from said flexible strip, including a beater for beating said strip material, said beater being disposed below the path of said strip material to beat said strip material after the strip material has been acted upon, as aforesaid, by said knife, including an upwardly-convex plate having an upper face to receive said strip material and a strip retaining member above said face and secured to said upwardly convex plate, whereby a space is provided between said plate and retaining member to slidably receive said strip material and means to move said upwardly-convex plate upwardly when said portions of said strip material still containing unsevered removable elements pass over said beater.

14. In a machine for processing strip material, said strip material including a flexible strip provided with removable elements separate from and attached to the strip and extending from a face thereof in a continuous, longitudinally-extending row, said machine including means to move said strip material along its longitudinal axis; a movable knife; means to intermittently move said knife to cut through selected portions of said elements; means to remove the cut-through elements from said flexible strip, whereby spaced-apart areas of said strip are freed of said removable elements; means to sever said strip at said areas including an oscillating knife; and means to retain said strip material taut while being severed by said last named knife; including a pair of strip-gripping rollers, disposed one above the other, having peripheral grooves to receive the removable elements-containing portions of said strip material and peripheral portions to frictionally grip the flexible strip portions of said strip material, said rollers being disposed to one side of the oscillatory path of said knife and between the last-named knife and the first-named knife, and an oscillating jaw member disposed to the other side of the oscillatory path of said knife and in the path of movement of said strip material, means to rotate said rollers and oscillate said jaw member in unison with the upper of said rollers rotating anti-clockwise and the lower of said rollers rotating anti-clockwise; and means to move one of said rollers toward the other of said rollers.

WILLIAM R. McDANIEL.

REFERENCES CITED

The following references are of record in the file of this patent:

UNITED STATES PATENTS

| Number | Name | Date |
| --- | --- | --- |
| 1,681,033 | Freeman | Aug. 14, 1928 |
| 2,082,408 | Lyon | June 1, 1937 |
| 2,111,116 | Holzapfel | Mar. 15, 1938 |
| 2,185,985 | Lund | Jan. 2, 1940 |
| 2,253,280 | Lormor | Aug. 19, 1941 |
| 2,289,252 | Dorweiler | July 7, 1942 |
| 2,431,714 | Sundstrand | Dec. 2, 1947 |